(12) United States Patent
Kovach et al.

(10) Patent No.: US 7,857,072 B2
(45) Date of Patent: Dec. 28, 2010

(54) ROW UNIT SOIL FINISHING APPARATUS

(75) Inventors: Michael G. Kovach, Morton, IL (US);
James L. Tetrick, Washington, IL (US);
Greg S. Smart, Bettendorf, IA (US);
Scott G. Ireland, Washburn, IL (US)

(73) Assignee: CNH America LLC, New Holland, PA (US)

( * ) Notice: Subject to any disclaimer, the term of this patent is extended or adjusted under 35 U.S.C. 154(b) by 25 days.

(21) Appl. No.: 12/207,473

(22) Filed: Sep. 9, 2008

(65) Prior Publication Data
US 2010/0059238 A1 Mar. 11, 2010

(51) Int. Cl.
*A01B 5/00* (2006.01)

(52) U.S. Cl. .................................. 172/196; 172/140

(58) Field of Classification Search ............. 172/139, 172/140, 144, 165, 174, 176, 196
See application file for complete search history.

(56) References Cited

U.S. PATENT DOCUMENTS

| | | | | |
|---|---|---|---|---|
| 58,277 | A * | 9/1866 | Metz et al. ................. | 172/170 |
| 1,329,375 | A * | 2/1920 | Collins ....................... | 172/176 |
| 2,030,567 | A * | 2/1936 | Bowen ........................ | 172/494 |
| 2,241,633 | A * | 5/1941 | Croce et al. ................. | 222/311 |
| 2,694,356 | A | 3/1951 | Haas | |
| 3,023,718 | A * | 3/1962 | Sorensen et al. ............ | 111/149 |
| 3,175,622 | A | 3/1965 | Stam | |
| 4,230,054 | A * | 10/1980 | Hatcher ....................... | 111/62 |
| 4,285,284 | A * | 8/1981 | van der Lely ............... | 111/188 |
| 4,311,104 | A * | 1/1982 | Steilen et al. ................ | 111/194 |
| 4,524,837 | A * | 6/1985 | Harden ........................ | 172/156 |
| 4,574,715 | A * | 3/1986 | Dietrich et al. ............ | 111/123 |
| 4,579,071 | A | 4/1986 | Johnson | |
| 4,608,933 | A * | 9/1986 | Wyrill, III ................... | 111/152 |
| 4,714,033 | A * | 12/1987 | Neumeyer ................... | 111/194 |
| 4,721,048 | A * | 1/1988 | Fuss et al. .................... | 111/156 |
| 4,723,495 | A | 2/1988 | Dietrich, Sr. et al. | |
| 4,831,945 | A | 5/1989 | Neumeyer | |
| 4,926,767 | A * | 5/1990 | Thomas ....................... | 111/187 |
| 5,025,736 | A * | 6/1991 | Anderson ................... | 111/152 |
| 5,080,178 | A | 1/1992 | Dietrich, Sr. | |
| 5,333,694 | A | 8/1994 | Roggenbuck et al. | |
| 5,431,232 | A | 7/1995 | Kirsch | |
| 5,562,055 | A | 10/1996 | Peterson | |
| 5,623,997 | A | 4/1997 | Rawson et al. | |
| 5,782,307 | A | 7/1998 | Forsyth | |
| 5,906,166 | A * | 5/1999 | Wagner ....................... | 111/170 |

(Continued)

FOREIGN PATENT DOCUMENTS

JP 2005194829 7/2005

*Primary Examiner*—Robert E Pezzuto
*Assistant Examiner*—Jamie L McGowan
(74) *Attorney, Agent, or Firm*—Rebecca Henkel (57) ABSTRACT

The agricultural row units feature soil finishing assemblies. This configuration of the finishing assembly provides a simple adjustment of the height of the finishing assembly to enhance usability and flexibility of the row unit. The improved adjustment mechanism enhances user control over the vertical distance between the finishing wheels/discs and the ground opening assembly. In an exemplary embodiment, soil finishing assembly is pivotally coupled to the row unit frame via a height adjustment assembly. The height adjustment assembly may feature a biasing member and other components to allow adjustment of one end of the pivotal coupling of the adjustment assembly within the row unit assembly.

18 Claims, 6 Drawing Sheets

U.S. PATENT DOCUMENTS

| | | | |
|---|---|---|---|
| 6,012,534 A * | 1/2000 | Kovach et al. | 172/196 |
| 6,068,061 A * | 5/2000 | Smith et al. | 172/139 |
| 6,119,608 A * | 9/2000 | Peterson et al. | 111/192 |
| 6,142,085 A * | 11/2000 | Drever et al. | 111/151 |
| 6,502,644 B2 * | 1/2003 | Steinlage et al. | 172/196 |
| 6,681,868 B2 * | 1/2004 | Kovach et al. | 172/701 |
| 6,761,120 B2 * | 7/2004 | Kovach et al. | 111/140 |
| 6,871,709 B2 * | 3/2005 | Knobloch et al. | 172/145 |
| 6,880,644 B2 | 4/2005 | Weast et al. | |
| 7,156,186 B2 | 1/2007 | Knobloch et al. | |
| 7,412,933 B2 * | 8/2008 | Bourgault et al. | 111/156 |
| 2004/0226727 A1 * | 11/2004 | Weast et al. | 172/684.5 |

* cited by examiner

ROW UNIT SOIL FINISHING APPARATUS

BACKGROUND

The invention relates generally to agricultural tillage implements, such as plows and ground penetrating row units, used in farming operations. More particularly, the invention relates to a ground penetrating assembly and a ground finishing assembly.

The ground penetrating assembly is used to break up the ground to enable seed deposition. A ground finishing assembly typically follows the ground opener assembly to create a soil finish that is desirable for planting. The ground finishing assembly or apparatus may contain firming wheels, blades or other tools to achieve the desired finish. The finishing apparatus may be utilized to create mounded berms or a flat undisturbed surface finish. The particular finish desired may depend on several conditions and may be necessary for optimum plant germination. Therefore, farmers may till their fields at various depths depending upon soil conditions.

BRIEF DESCRIPTION

Embodiments of the present invention provide a novel configuration for agricultural row units that feature soil finishing assemblies. This configuration of the finishing assembly provides a simple adjustment of the height of the finishing assembly to enhance usability and flexibility of the row unit. The improved and simplified adjustment mechanism enhances user control over the vertical distance between the finishing wheels/discs and the ground opening assembly. In an exemplary embodiment, the soil finishing assembly is pivotally coupled to the row unit frame via a height adjustment assembly. The height adjustment assembly may feature a biasing member and other components to enable a quick adjustment of one end of the pivotal coupling of the adjustment assembly within the row unit assembly.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in detail below, various configurations of agricultural implement ground finishing assemblies may be employed to simplify finishing height of a terrain for an operator. In particular, an embodiment includes a simple pin adjustment, that can enable height adjustment without tools or adjustment of other implement components. This arrangement simplifies height adjustment for an operator, enabling the operator to quickly change the height of the finishing assembly. Moreover, the embodiment enables height adjustment of the finishing assembly that is used to control the firming of the soil.

Figure 1:
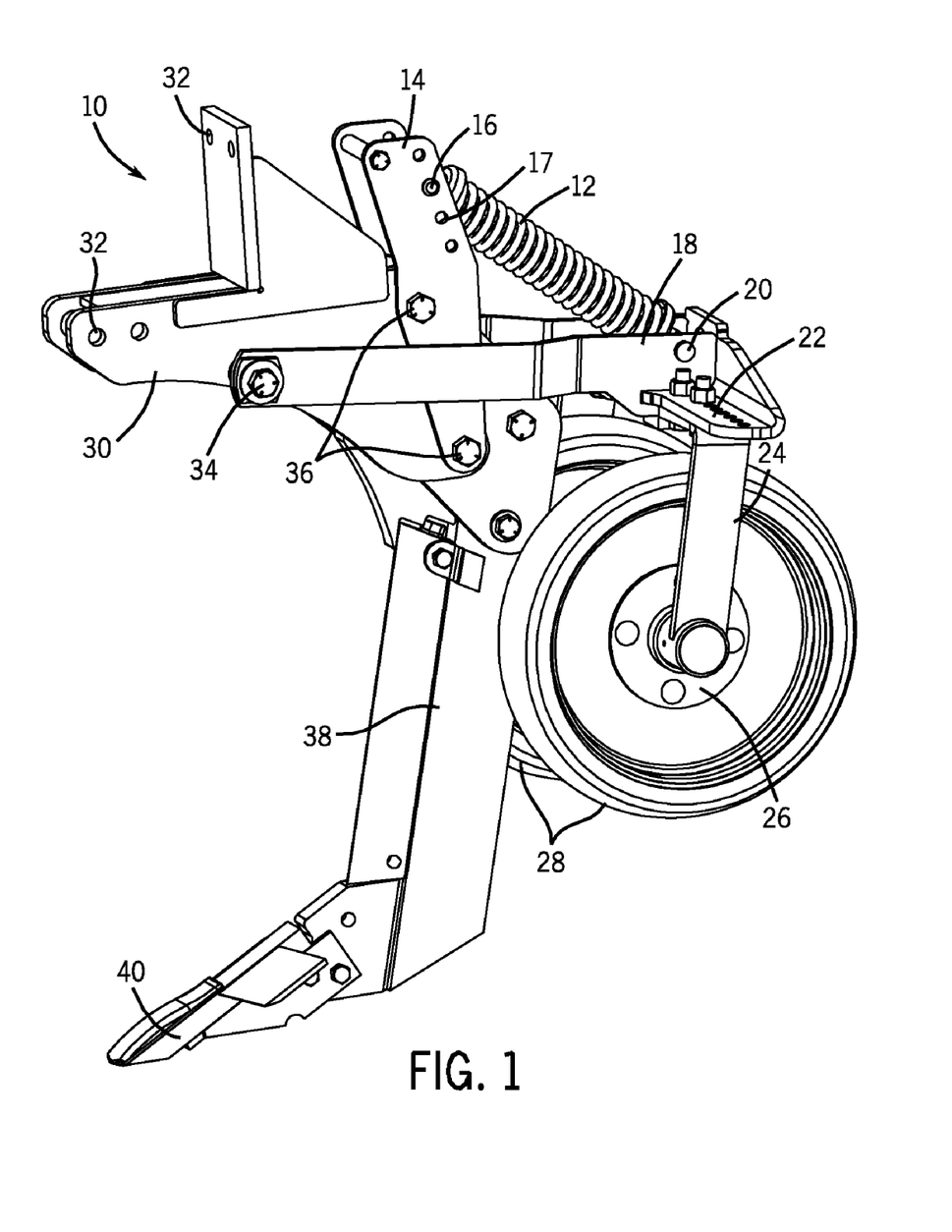
FIG. 1 is a side perspective view of an embodiment of a row unit assembly, including a ground penetrating assembly, finishing wheels, and a height adjustment assembly.

Turning now to the drawings and referring first to FIG. 1, an embodiment of a tillage assembly in the form of a plow assembly is illustrated and designated generally by reference numeral 10. As discussed in detail below, the assembly 10 includes a unique height adjustment assembly 12 to enable quick and easy adjustments of finishing equipment. In the present context, the planter assembly may also be referred to as a plow assembly, a ground opening/penetrating assembly or an opener assembly. Plow assembly 10 is a type of row unit, a plurality of which may be placed on an agricultural implement to be towed by a tractor in order to prepare for planting of crops.

Plow assembly 10 includes the height adjustment assembly 12, which is pivotally coupled to upper bracket 14 via pivot pin 16. Pivot pin 16 is located on a first end of height adjustment assembly 12 and is configured to be inserted in height adjustment holes 17. A second end of height adjustment assembly 12 is pivotally mounted to mounting bracket 18 via holes and lower boss 20. Lower holes and lower boss 20 may include bolts, nuts, and/or pins to pivotally couple mounting bracket 18 to the height adjustment assembly 12. Included in mounting bracket 18 are horizontal plates 22, which are arranged to allow simple adjustments and mounting of finishing wheels or other tools. Mounting bracket 18 and horizontal plates 22 are coupled via fasteners to finishing wheel arms 24, which in turn are coupled to finishing wheel mounting assemblies 26. Finishing wheel arms 24 and finishing wheel mounting assemblies 26 may feature bearings, hubs, or any suitable joints to facilitate rotation. In an embodiment, finishing wheel mounting assembly 26 includes holes and fasteners, such as bolts, to allow the mounting of finishing wheels 28. Finishing wheels 28 may include steel or aluminum wheel and rubber tires. In an embodiment, the finishing wheels 28 may be composed of one or more wheels to contact the ground and shape the soil to a desire surface finish. As will be discussed later, finishing wheels 28 may be removed from finishing wheel mounting assembly 26 and replaced with disks or other suitable tools to shape and finish the soil.

Plow assembly 10 also includes is main bracket 30, which may be configured to couple the plow assembly 10 to a tool bar located on the tillage assembly via holes 32 and a fastener mechanism. As previously mentioned, multiple plow assemblies 10 may be coupled to a tool bar to comprise an agricultural implement. For example, an agricultural implement may include 6, 12, 18, or more plow assemblies. Components of plow assembly 10, such as main bracket 30, may be formed from any suitable strong material, such as steel. Main bracket 30 provides support to mounting bracket 18 via pivotal coupling 34, which may include a bolt and nut to allow movement of the finishing wheels 28. Also supported by main bracket 30 is upper bracket 14, which may be rigidly coupled to main bracket 30 via bolts 36. Further, plow assembly 10 includes a shank 38, which is rigidly coupled to both support bracket 30 and ground penetrating assembly 40. Ground penetrating assembly 40 may include an opener, a chisel plow, a knife, or a Minimum Soil Displacement chisel plow. As illustrated, finishing wheels 28 contact and shape the soil aft of ground penetrating assembly 40.

In the present context, finishing wheel arms 24, finishing wheel mounting assemblies 26, and finishing wheels 28 may collectively be referred to as a finishing assembly or finishing wheel assembly. In an embodiment, the arrangement of the upper bracket 14, the finishing assembly, and the height adjustment assembly 12 facilitate a simple height adjustment of the finishing wheels 28 relative to the ground penetrating tool 40. Further, in certain embodiments, the adjustment assembly is configured to change height, relative to the tool 40, by removal and insertion of pivot pin 16 in upper bracket 14. For example, the pivot pin 16 may be removed from one set of holes and reinserted into another set of holes to adjust the position of wheels 28.

Figure 2:
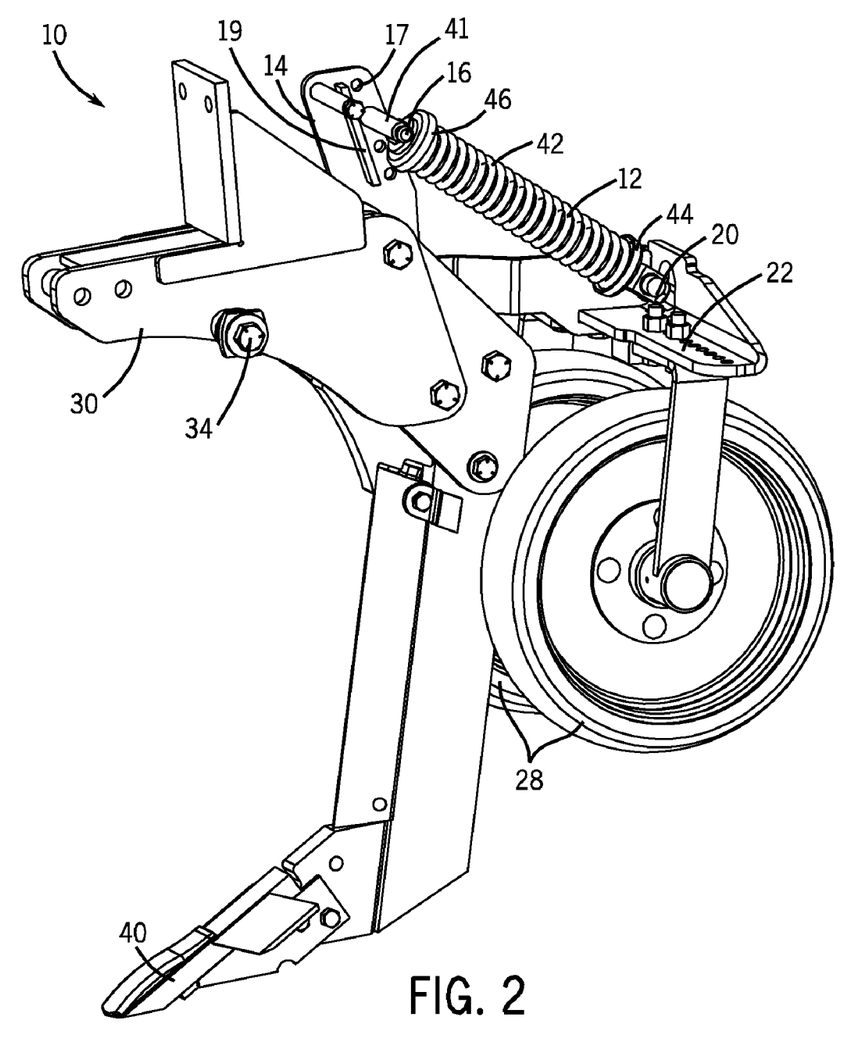
FIG. 2 is a side perspective view of the row unit assembly shown in FIG. 1 with certain components removed for clarity.

FIG. 2 illustrates a perspective view of the plow assembly 10 with certain components removed to enhance clarity. Specifically, a side plate of upper bracket 14 and a side plate of mounting bracket 18 has been removed to show height adjustment assembly 12 in greater detail. As depicted, guide plate 19 runs alongside adjustment holes 17, thereby preventing pin 16 and pin tube 41 from falling outside upper bracket 14 during a height adjustment process. Guide plate 19 may be mounted on the inside of either side of upper bracket 14 alongside holes 17 to enable an easy height adjustment for an operator. In an embodiment, height adjustment assembly 12 includes compression spring 42, lower spring seat 44 and upper spring seat 46. A first end of the compression spring 42 may couple to upper spring seat 46 and a second end of compression spring 42 may couple to lower spring seat 44. Upper and lower spring seats 46 and 44 may be disposed in substantially parallel planes to one another. Further, pivot pin 16 is coupled to upper spring seat 16 and lower pivot pin 20 is coupled to lower spring seat 44.

In an embodiment, mounting holes 17 are shown in one side plate of upper bracket 14 to facilitate a height adjustment of the finishing assembly via pivot pin 16. For example, the mounting holes 17 may be spaced apart at about 2 inches, thereby enabling a total height adjustment from the top mounting hole to the bottom mounting hole of around 16 inches. Further, the illustration shows that a simple height adjustment may be made by moving pivot pin 16 within mounting holes 17 to adjust the height of the finishing assembly. As discussed below, placement of pivot pin 16 in the uppermost hole 17 will cause pivotal movement of mounting bracket 18 about pivotal coupling 34, thereby raising the height of finishing wheels 28, and will also lessen the soil firming of ground penetrating assembly 40 and finishing wheels 28. As pivot pin 16 is moved into lower holes 17, the height of finishing wheels 28 is lowered, increasing the firming of the soil.

Figure 3:
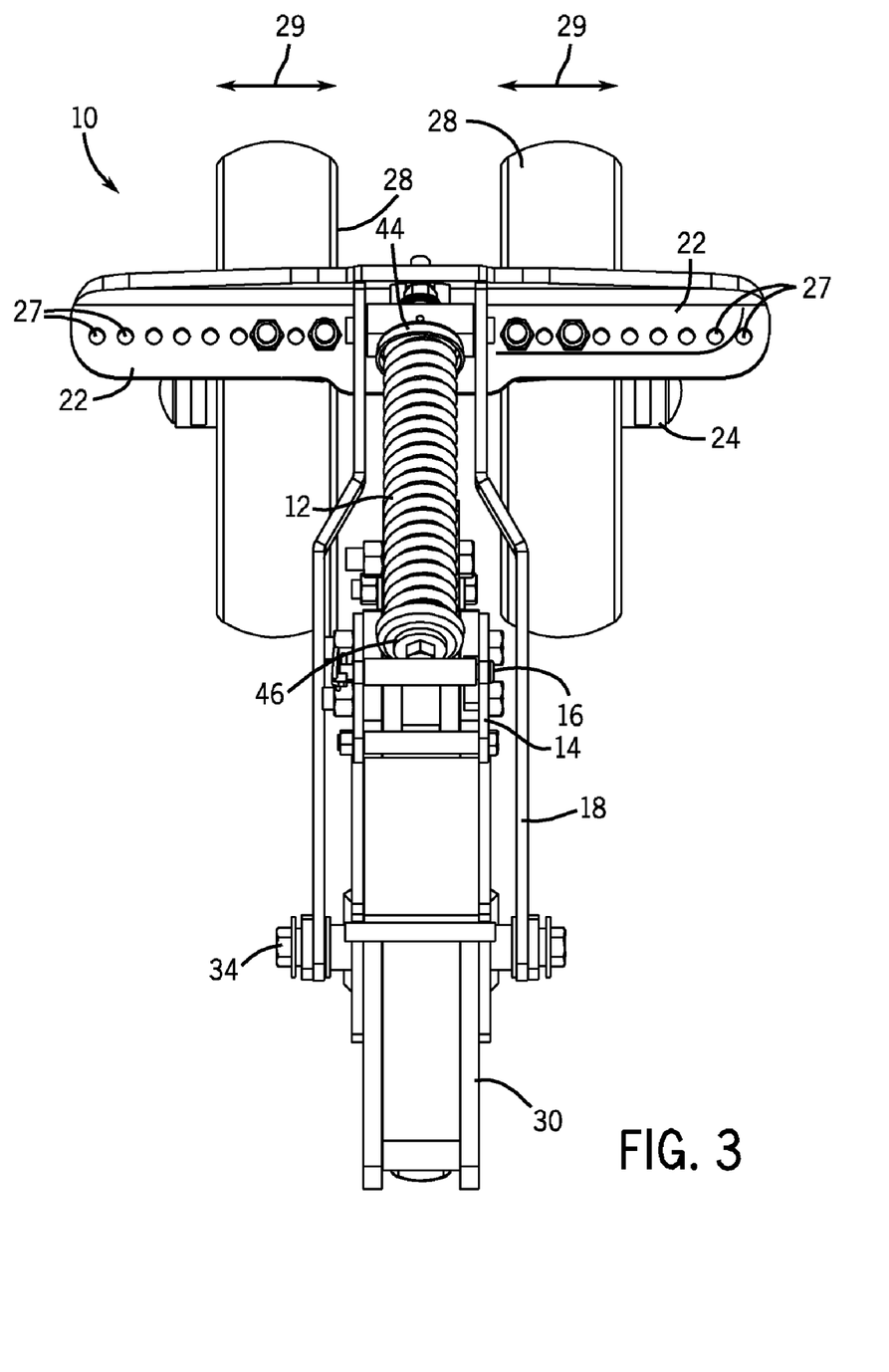
FIG. 3 is a top view of the row unit assembly shown in FIG. 1, including the ground finishing wheels and the height adjustment assembly.

A top view of the plow assembly 10 is illustrated in FIG. 3. The figure shows finishing wheels 28, lower spring seat 44, upper spring seat 46, height adjustment assembly 12, and pivot pin 16. The diagram shows that pivot pin 16 is coupled to upper spring seat 46 via a fastener assembly and is inserted in upper bracket 14. The illustration also shows that horizontal mounting plates 22 may feature holes 27 and fasteners to enable an operator to control the spacing of the finishing wheels 28. For example, the space between finishing wheels 28 may be used to control the width of the berm being shaped by the finishing assembly and the movement of finishing wheels 28, shown by arrows 29. Further, finishing wheel arms 24 are also adjustable to be slanted fore and aft, to control the amount of soil moved by finishing wheels 28. This is accomplished by assembling the left finishing wheel arm 24 on the right-hand side and vice-versa. This modified arrangement causes the blades 58 to be closer or further rearward of 40, thereby creating a larger mound. For example, the bolts mounting finishing wheels 28 to plates 22 may be removed and each of the finishing wheels 28 may be rotated 180° about a vertical axis and remounted. At this position, finishing wheels 28 are located on the outside of finishing wheel arms 24, thus creating and firming a larger mound of soil.

Figure 4:
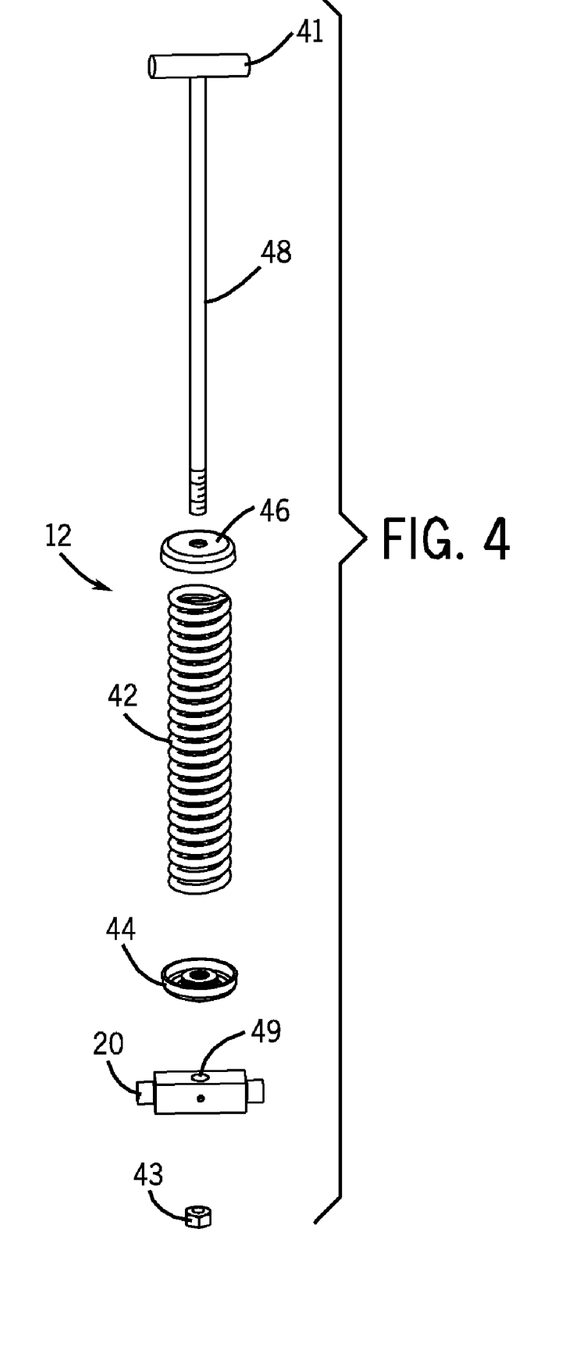
FIG. 4 is an exploded perspective view of an embodiment of the height adjustment assembly shown in FIGS. 1-3.

FIG. 4 illustrates an exploded view of height adjustment assembly 12 and its components. Included in the assembly is tension member 48, which is surrounded by compression spring 42. In an embodiment, tension member 48 may be coupled to and run through upper spring seat 46 and lower spring seat 44 via any suitable fastener, such as by the threaded portion of member 48 and nut 43. As discussed above, coupled to the ends of height adjustment assembly 12 are pivot tube 41 and boss member 20 which, in turn, are coupled to upper bracket 14 and mounting bracket 18. The arrangement of height adjustment assembly 12 enables some compression of spring 42 as finishing wheels 28 ride over changes in elevation of the soil, such as large soil clods, thereby temporarily increasing the distance between ground penetrating tool 40 and finishing wheels 28.

In an embodiment, the lower end of tension member 48 may be permitted to travel through an opening 49 in lower boss member 20 as the finishing wheels 28 move upward, allowing the compression of spring 42. The other end of tension member 48 is rigidly coupled to pivot tube 41 and may be referred to a T bolt. In the example, the finishing wheels 28 may be moved upward by passing over elevated terrain, thereby compressing the spring 42, decreasing the distance between spring seats 46 and 44, while tension member 48 protrudes through the opening 49 in the lower spring seat 44. Further, when the finishing wheels return to a neutral position (e.g., a generally flat terrain), a nut attached to the lower end of tension member 48 serves as a stop, thereby pressing against the outer portion of boss member 20 to maintain the maximum fixed distance between the spring seats 44 and 46. The maximum fixed distance between the spring seats 44 and 46 is directly related to, and thereby controls, the minimum vertical distance, or firming height, between tool 40 and finishing wheels 28. This will be shown in detail in the FIG. 5.

Figure 5:
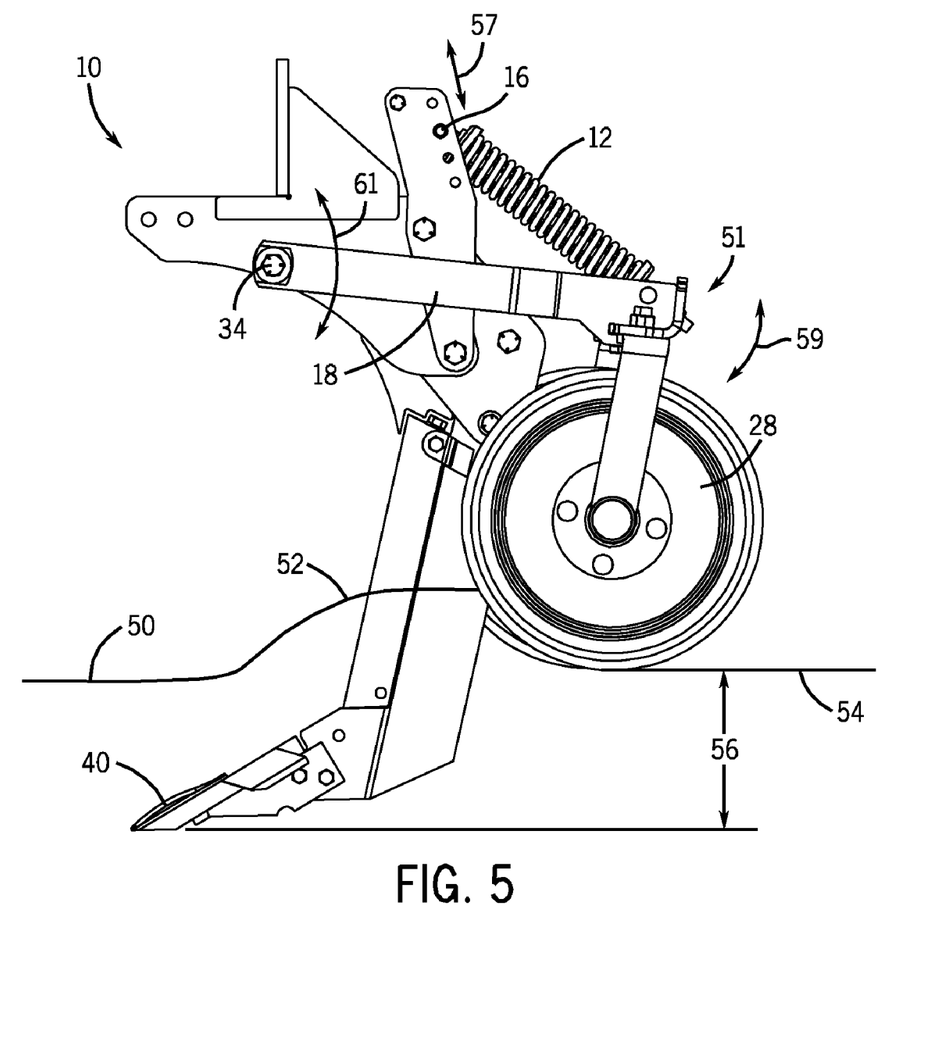
FIG. 5 is a side view of the row unit assembly shown in FIG. 1, further illustrating the placement of the finishing wheels relative to the ground opening tool and the soil profile.

FIG. 5 illustrates a side view of an embodiment of plow assembly 10 in operation. The plow assembly 10 is shown performing a ground opening or tilling operation, wherein reference numeral 50 represents pre-tillage soil and numeral 52 represents raised or tilled soil that has been loosened by ground penetrating tool 40. In an embodiment, finishing wheel 28 contacts the loosened soil 52, thereby shaping and firming the soil as indicated by numeral 54. Height adjustment assembly 12 and firming wheel 28 are configured to achieve a firming height 56 (e.g., vertical distance between tool 40 and wheels 28) that will result in the desired soil height and/or soil finish. In the case of berm building blades instead of firming wheels, height 56 may control a finished berm height. As discussed above, the height adjustment assembly 12 enables the operator to easily set a minimum firming height 56 for the finishing wheels 28. Soil finishing assembly 51, including finishing wheels 28 and height adjustment assembly 12, may be utilized to firm the soil into a berm, fill the furrow behind the ground opening tool 40 and/or level the berm. The soil finishing assembly 51 may reduce the tendency of loosened top soil to be moved laterally by weather or other forces, such as wind or rain. Thus, the arrangement of the plow assembly 10 and finishing assembly 51 provide a field that is more ready for planting without a need for further tillage or harrowing. Further, the simple height adjustment assembly 12 of the plow system 10 enables the operator to optimize firming height 56 to achieve optimal farming conditions.

As illustrated, height adjustment assembly 12 enables an adjustment of pivot pin 16 in direction 57, thereby changing the position of finishing wheels 28, shown by arrow 59. As finishing wheels 28 move in direction 59, mounting bracket 18 rotates about pivotal coupling 34, shown by arrow 61. Arrow 59 indicates that finishing wheels 28 may move in a curved path, that results in a horizontal and vertical movement.

Figure 6:
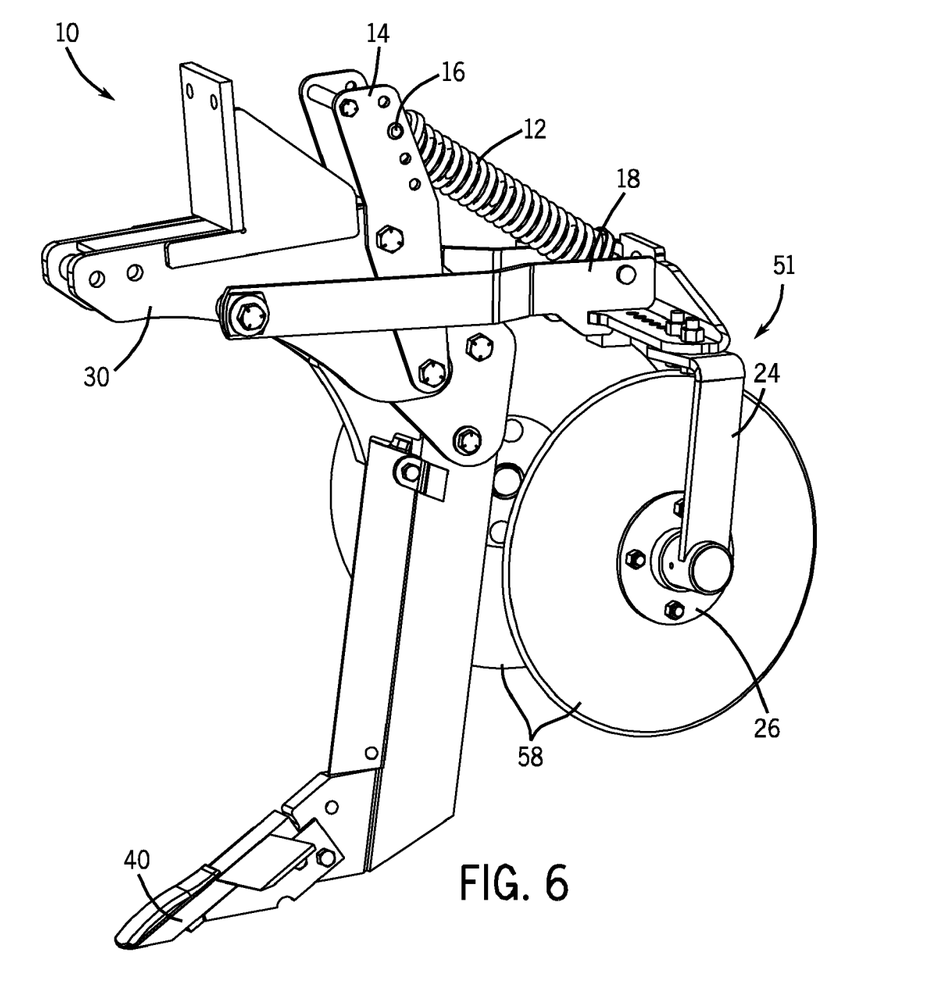
FIG. 6 is a side perspective view of an embodiment of a row unit assembly, including a ground penetrating assembly, berm building blades, and the height adjustment assembly.

FIG. 6 illustrates and embodiment of plow assembly 10 wherein the finishing wheels 28 have been replaced by berm building disk blades 58 mounted to finishing wheel mounting assembly 26. Disk blades 58 shape the soil, whereas finishing wheels 28 firm the soil as the plow assembly passes over the terrain. The fasteners on mounting assemblies 26 may be removed to enable an operator easily to change from firming wheels to disk blades or other suitable finishing tools. In an embodiment, the ground penetrating tool 40 may be changed along with finishing wheels 28 or berm building disk blades 58 to accommodate changes in soil or other conditions. Further, the finishing wheels 28 or berm building disk blades 58 may be mounted with the right and left wheel arms 24 reversed (instead of as shown) to control the amount of soil caught by the blades or tires. In the case of the berm building disk blades 58, they can be mounted with the concave side facing inward, which builds a loose soil mound, or with the concave side facing outward, which builds a compressed mound. As previously discussed, finishing wheels 28 may be adjusted in a similar manner to control the size of the soil mound that is firmed. These positional adjustments to the angles and locations of finishing wheels 28 and disk blades 58 may be enabled by unbolting finishing wheel arms 24 from the holes on horizontal plates 22 and remounting the arms 24 where the wheels 28 or blades 58 are located outside the arms 24.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural system comprising:
   a support bracket configured to couple to a plow assembly;
   a mounting bracket pivotally coupled to the support bracket; wherein said mounting bracket having horizontal plates;
   a shank coupled to said support bracket; wherein said shank is non-curved and extends downwardly from said mounting bracket;
   a ground penetrating assembly coupled to said shank;
   an upper bracket coupled to the support bracket;
   a finishing wheel arm mounted to said horizontal plates;
   a finishing wheel mounting assembly mounted to said finishing wheel arm;
   a plurality of finishing wheels coupled to the finishing wheel mounting assembly and configured to contact a surface of the ground aft of the ground penetrating assembly; and
   a height adjustment assembly comprising a biasing member, wherein a first end of the adjustment assembly is pivotally coupled to the upper bracket and a second end of the height adjustment assembly is pivotally coupled to the mounting bracket, a pivot point of the height adjustment assembly being movable to enable a vertical adjustment of the finishing assembly with respect to the ground penetrating assembly and thereby adjustment of soil conditioning; wherein the height adjustment assembly comprises a pivot pin coupling the adjustment assembly to the upper bracket; wherein the upper bracket comprises a plurality of holes to receive the pin, wherein the holes are disposed at different positions configured to enable the vertical adjustment of the finishing assembly without affecting down pressure of the ground penetrating assembly.

2. The system of claim 1, wherein the finishing wheels configured to ride on and firm soil displaced by the ground penetrating assembly.

3. The system of claim 1, wherein the finishing assembly comprises berm building disc blades configured to engage and shape soil displaced by the ground penetrating assembly.

4. The system of claim 1, wherein the ground penetrating assembly comprises a tool rigidly mounted to a lower end of a shank.

5. The system of claim 1, wherein the biasing member is configured to urge the finishing assembly downward by exerting a force on the upper bracket.

6. The system of claim 1, wherein the finishing wheels configured to ride on and firm soil displaced by the ground penetrating assembly and configured to be mounted to a plurality of locations on the mounting bracket to control an amount of soil to be displaced.

7. The system of claim 6, wherein the biasing member maintains a predetermined distance between the upper bracket and the mounting bracket to define the vertical adjustment of the finishing assembly with respect to the ground penetrating assembly.

8. The system of claim 7, wherein the compression spring permits limited variation in depth of the ground penetrating assembly but urges the ground penetrating assembly towards a set depth with respect to the finishing assembly.

9. A tillage system comprising:
   a ground penetrating assembly coupled to a shank;
   said shank coupled to a support structure; wherein said shank is non-curved and extends downwardly from said support structure;
   a mounting bracket pivotally coupled to the support structure; wherein said mounting bracket having horizontal plates attached thereto;
   a finishing assembly coupled to the said horizontal plate and configured to contact a surface of the ground aft of the ground penetrating assembly; and
   an upper bracket coupled to the support structure, wherein the upper bracket comprises holes; and
   a height adjustment assembly comprising a compression spring and a tension member extending longitudinally through the compression spring, wherein the tension member is configured to maintain a predetermined distance between the upper bracket and the mounting bracket, a first end of the height adjustment assembly is pivotally coupled to the mounting bracket, a second end of the height adjustment assembly comprises a pivot pin configured to selectively insert in different holes in the upper bracket to change a joint connection position to enable a vertical adjustment of the finishing assembly with respect to the ground penetrating assembly; wherein the height adjustment assembly enables the vertical adjustment of the finishing assembly without affecting down pressure of the ground penetrating assembly.

10. The system of claim 9, wherein the finishing assembly comprises a firming wheel configured to ride on and firm soil displaced by the ground penetrating assembly.

11. The system of claim 9, wherein the finishing assembly comprises berm building disc blades configured to engage and shape soil displaced by the ground penetrating assembly.

12. The system of claim 9, wherein the ground penetrating assembly comprises a tool rigidly mounted to a lower end of said shank.

13. The system of claim 9, wherein the compression spring is configured to urge the finishing assembly downward by exerting a force on the upper bracket.

14. A method of manufacturing an agricultural row unit system, the method comprising:
   mounting a ground penetrating assembly to extend from a shank;
   said shank coupled to a support structure; wherein said shank is non-curved and extends downwardly from said support structure;
   pivotally coupling a mounting bracket to the support structure;
   coupling a soil finishing assembly to the mounting bracket aft of the ground penetrating assembly;
   pivotally coupling a first end of a height adjustment assembly to the mounting bracket, wherein the height adjustment assembly comprises a biasing member; and
   pivotally coupling a second end of the height adjustment assembly to an upper bracket, wherein the height adjustment assembly is movable to enable a vertical adjustment of the finishing assembly with respect to the ground penetrating assembly and thereby adjustment of a planting depth; wherein the upper bracket comprises holes and the method comprises inserting a pivot pin of the height adjustment assembly selectively to different holes in the upper bracket, wherein the pivot pin and holes enable a vertical adjustment of the finishing assembly with respect to the ground penetrating assembly; without affecting down pressure of the ground penetrating assembly.

15. The method of claim 14, wherein the height adjustment assembly comprises a compression spring and a tension member extending longitudinally through the compression spring, wherein the tension member is configured to maintain a predetermined distance between the upper bracket and the mounting bracket.

16. The method of claim 15, wherein the compression spring permits limited variation in depth of the ground penetrating assembly but urges the ground penetrating assembly towards a set depth with respect to the finishing assembly.

17. The method of claim 14, comprising mounting a firming wheel to the finishing assembly wherein the firming wheel is configured to ride on and firm or shape soil displaced by the ground penetrating assembly.

18. The method of claim 14, comprising mounting berm building disc blades to the finishing assembly wherein the berm building disc blades are configured to engage and shape soil displaced by the ground penetrating assembly.

* * * * *